United States Patent Office 3,104,382
Patented Sept. 17, 1963

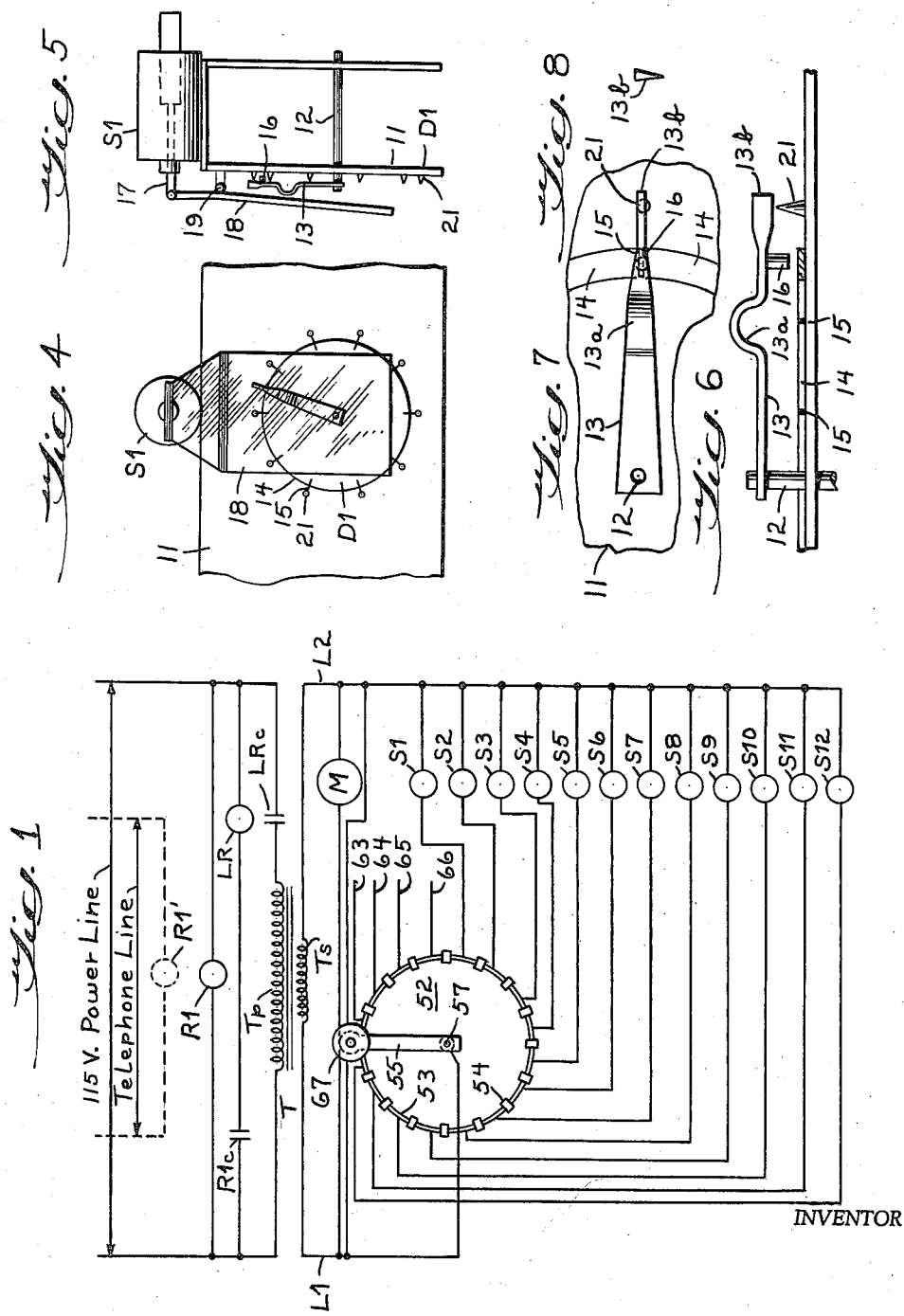

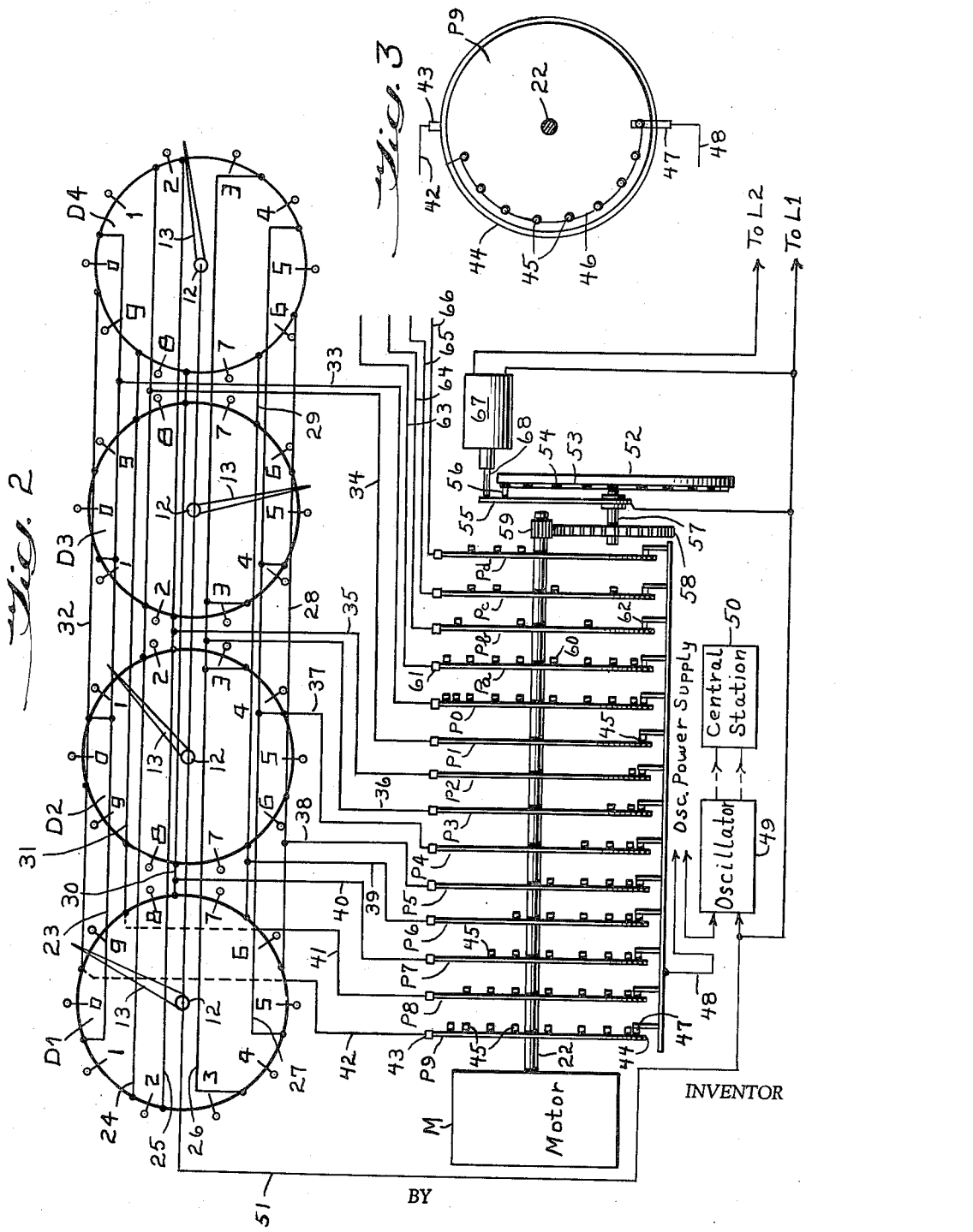

3,104,382
APPARATUS FOR REMOTE READING OF UTILITY METERS
Donald P. Morgan, 203 4th Ave., Warren, Pa., and Donald D. Dalrymple, 6 Woods Road, North Warren, Pa.
Filed May 22, 1961, Ser. No. 119,250
10 Claims. (Cl. 340—204)

This invention relates in general to telemetering systems and more particularly to an improved apparatus for reading utility meters such as residential or commercial plant electric, gas or water meters from a central station as distinguished from the conventional practice of having the meters read directly at the meter location by personnel sent out by the utility company.

An object of the invention is to provide an improved arrangement which is comparatively simple in construction and can be made at relatively low cost for reading the several dials of one or more utility meters of the conventional, decimal integrating type and transmitting the meter readings back to a central station by way of code pulses for recording, billing and the like. These code pulses may be carried over existing telephone or power or other utility lines by means of generally conventional carrier technique.

Another object is to provide an improved meter reading apparatus which can be easily applied at relatively low cost by way of modification of the register assembly of existing utility meters thus make it unnecessary to replace these meters with specially constructed meters when changing over from personal to automatic central station reading in accordance with the invention.

Still another object of the invention is to provide a remote meter reading apparatus without adding any friction load, which includes a special reading head that can be attached to existing meters in substitution for the existing reading head or register, the special head including rotary contact arms which can be easily attached to the existing drive shafts for the various pointer elements of the meter register. These contact arms are arranged for cooperation with special dials having contact segments thereon representative of different positions of the contact arms about the axis of rotation to establish corresponding code pulsing circuits through a rotary code pulse disc assembly and by means of which correspondingly coded pulses representative of the respective positions of the several contact arms are transmitted in succession to a central station for purposes of recording.

The foregoing as well as other objects and advantages of the invention will become more apparent from the following detailed description of a preferred embodiment in conjunction with the accompanying drawings wherein:

FIG. 1 is an electrical schematic view showing the meter reading system in general;

FIG. 2 is a combined electrical schematic and structural view showing the special dials for one meter, the motor-driven code pulse control assembly and the oscillator controlled thereby for sending the proper code pulses representative of the reading on each meter register dial to the central station;

FIG. 3 is an end view of one of the discs of the code pulse control assembly;

FIG. 4 is a view in front elevation of a portion of the special face plate showing one of the special dials, the special hand or contact arm thereon and the solenoid utilized for pressing the contact arm inwardly against a contact segment on the dial;

FIG. 5 is a view in side elevation of the assembly shown in FIG. 4;

FIG. 6 is a view in elevation, drawn to an enlarged scale showing a portion of the face plate, dial, segmental contacts and contact arm;

FIG. 7 is a top plan of the structure shown in FIG. 6; and

FIG. 8 is a detail showing the wedge-shaped configuration of the outer end of the contact arm.

In accordance with this invention, existing meters of the decimal integrating type may be modified to substitute for the existing register and pointer elements, a face plate 11 having disposed thereon a plurality of indicator dials which may be identical in size and location as those on the existing meter register. In the illustrated embodiment, four dials are shown and these have been designated D1, D2, D3 and D4 and correspond to the four decimal registers usually employed in a utility meter. The existing pointer elements or hands on the corresponding drive shafts are replaced with special hands 13 which are in fact contact arms that are adapted to rotate about the peripheries of the dials on drive shaft extensions 12 so as to establish contact therewith. The periphery of each dial is divided into ten arcuate electrically conductive contact segments 14 representing the digits 0 through 9 and each segment is electrically insulated from the adjacent segments at the ten points of division by means of an insert 15 of insulating material as shown in FIGS. 4 and 7. Each of the hands 13 is provided with a single contact element 16 which is adapted to engage a particular one of the arcuate contact segments 14 dependent upon the particular angular position of the hand 13, the latter being rotated by the internal mechanism of the meter, at the time the meter is read.

Located above each of the dials on the support structure 11 is a solenoid. The solenoid S1 associated with dial D1 is shown in FIGS. 4 and 5, and similar solenoids S2, S3 and S4, see FIG. 1, are similarly associated with dials D2, D3 and D4. The armature 17 of each solenoid is articulated to a plate 18 which may be of insulating material and also transparent if desired. Each plate 18 is pivotally mounted at 19 so that as the solenoid S1, for example, becomes energized, armature 17 is shifted to the left thus causing plate 18 to press against an outwardly bowed portion 13a of contact arm 13 and causes contact 16 to engage one of the ten arcuate contact segments 14. It is possible, of course, that when a particular solenoid S1 to S4 is energized to "read" the position of the contact arm on the dial associated therewith, such arm might be aligned practically exactly with one of the ten division points on the dial. To make certain that the contact 16 on the arm will positively engage one of the contact segments 14 on the dial, the latter may be provided with ten peripherally spaced conical deflecting pins 21 which are arranged at the ten division points around the dial for cooperation with the outer wedge-shaped end 13b of arm 13. Thus, should the arm 13 be forced inwardly towards the dial when the latter is in line with one of the ten division points on the dial, the wedge-shaped end 13b will be deflected to one side or the other of the conical member 21 as it strikes the latter thus causing contact 16 to engage only one of the contact segments 14 rather than possibly come to rest against the insulative insert 15 and also make contact with the contact segments to each side thereof.

In addition to the special face plate 11 with the dials D1–D4 thereon, the read-off device for each meter in accordance with the invention includes a code pulse control assembly shown in FIG. 2 which comprises a plurality of code pulse control discs P0 to P9 of insulating material secured in axially spaced relation along a drive shaft 22 which is driven by motor M. As shown in FIG. 2, all of the arcuate contact segments 14 of the various dials D1 to D4 which correspond to like positions on the dials are electrically interconnected such as by suitable moulded or printed circuit technique. For example, a conductor 23 interconnects all of the contact segments which lie between the digits 0 and 1 on the four dials D1 to D4, and similar conductors 24–32 interconnect the other like positioned contact segments on these dials. Moreover, these contact segment interconnecting conductors 23–32 are connected electrically to the rotatable code pulse control discs P0 to P9 respectively by means of conductors 33–42 which terminate in brushes 43 that engage the rim portions 44 of the discs which are made of conductive material for this purpose. The remainder of the body portion of these discs P0 to P9 is constituted by electrical insulation material.

With reference to FIG. 3 which shows code pulse disc P9, it will be seen that it is provided with a plurality of contact pins 45 arranged in equi-spaced relation along an arcuate path near the periphery of the disc and which project laterally from one face of the disc. These contact pins are all electrically connected together by a conductor 46 which in turn is electrically connected with the rim 44 and hence, with brush 43 and conductor 42 leading to all contact segments on dials D1–D4 which lie between 9 and 0. Another brush 47 is arranged to contact the ends of pins 45 as the disc rotates. This brush 47 is connected by conductor 48 to one input terminal of an oscillator unit 49 to produce output pulses which correspond in number to the number of pins 45 on disc P9 or to the number of pins on the other discs P0 to P8 depending upon the one which is selected, these output pulses being transmitted over suitable channels to the central station 50 for recording and translation into related billing to the customer.

Code pulse disc P9 is provided with nine of the contact pins 45, disc P8 is provided with eight of these pins 45, and the other discs P7 to P1 are provided respectively with corresponding lesser number of contact pins decreasing by one from disc to disc so that disc P1 has only one contact pin 45. Disc P0 is provided with ten of these contact pins. All of the contact pins on the various discs P9 to P0 are contained within 180° of arc, i.e. half the circumference of the disc.

It will also be seen from FIG. 2 that all of the contact arms 13 associated with dials D1 to D4 are electrically interconnected by conductor 51 which is connected to the other input terminal of oscillator unit 49. Thus, assuming the contact arms 13 of the four dials D1 to D4 to be in the positions illustrated respectively in FIG. 2 at the time when the meter is read, energization of solenoid S1, associated with dial D1, for a period corresponding to one complete revolution of shaft 22 and the code pulse disc assembly will cause contact arm 13 to engage that contact segment 14 which lies between digits 9 and 0 on the dial thus establishing an intermittently closed circuit for the oscillator power supply to the input of oscillator 49, one side of this circuit being continuous through the common conductor 51 connected to contact arm 13, and the other side of this circuit being closed intermittently since it extends through conductor 42, brush 43, rim 44, conductor 46, contact pins 45 and brush 47 to conductor 48. Thus, the power supply circuit to oscillator 49 will be closed each time brush 47 makes contact with one of the pins 45, or a total of nine circuit closures which results in sending nine code pulses from oscillator 49 to the central station 50.

In a similar manner, energization of solenoid S2, associated with dial D2 for the next revolution of shaft 22 results in a sending out of only one pulse since the circuit connection is from contact arm 13 via conductors 24, 34 and disc P1 which has only one contact pin. Next, solenoid S3, associated with dial D3, is energized for the next revolution of shaft 22 and results in the sending out of five pulses since the circuit connection is from contact arm 13 via conductors 28, 38 and disc P5 which has five of the contact pins 45. Next, energization of solenoid S4, associated with dial D4 for the next revolution of shaft 22 results in sending out two pulses since the circuit connection is from contact arm 13 via conductors 25, 35 and disc P2 which has two of the contact pins 45.

Energization of solenoids S1–S4 in sequence is controlled by means of a stationary selector disc 52 having a plurality of arcuate contact segments 53 arranged in a circle and spaced from each other by inserts 54 of insulating material. In the present embodiment, disc 52 is provided with sixteen contact segments 53. Arranged to wipe over these contact segments is a rotary contact arm 55 having a contact pin 56 adapted to engage the contact segments 53 in sequence as arm 55 is rotated about an axis coincident with the center of disc 52. For this purpose, contact arm 55 is mounted on a shaft 57 on which is mounted a gear 58 that meshes with a pinion 59 mounted on the end of shaft 22. The arrangement is such that for one complete reading cycle, contact arm 55 will make one complete revolution. Consequently, in the present embodiment as shown in FIG. 1 which provides for reading three different meters, such as the electric meter, gas meter and water meter, thus requiring solenoids S1–S4 for the four dials of the meter shown in FIG. 2, solenoids S5–S8 for four dials of a second meter, and solenoids S9–S12 for four dials of a third meter, the gear ratio of the driving pinion 59 to the driven gear 58 will be sixteen to one. In addition to the twelve contact segments 53 assigned respectively to the solenoids S1 to S12, four more contact segments are provided for use in transmitting the meter number to the central station. These last four segments are associated respectively with four other pulse code control discs Pa to Pd also mounted on shaft 22 and these discs are similar in construction to the other pulse code control discs P0 to P9 and are provided with a selected number of contact pins 60. In the illustrated embodiment, disc Pa has eight of the contact pins 60, disc Pb has three contact pins, disc Pc has four contact pins, and disc Pd has three contact pins. As in the case of the pulse code control discs P0 to P9, the pulse code control discs Pa to Pd each have an electrically conductive rim to which all the contact pins 60 are connected and a brush 61 which engages the conductive rim as these discs rotate. A similar brush 62 is adapted to engage the pins 60 in succession. Brush 62, as shown in FIG. 2 is electrically connected by conductor 48 through the oscillator power supply to one input terminal on oscillator 49. Brushes 61 are connected respectively by conductors 63–66 to the first four contact segments 53 on disc 52.

The contact pins 45 on the pulse code control discs P0 to P9 differ in number but have the same spacing therebetween. The contact pins 60 on pulse code control discs Pa to Pd also may differ in number and also may differ in spacing therebetween so that the number of pulses sent by the oscillator may not only differ in number but also in the intervals therebetween. In this manner, a very large group of meter numbers can be accommodated at the central station for selective reading.

Associated with contact arm 55 is a solenoid 67 having a spring loaded reciprocating armature that serves to actuate a pin 68 to lock contact arm 55 in the "zero" or start position when motor M is de-energized. As shown in FIG. 1, contact arm 55 is electrically connected to line L1, the contact segments 53 are connected respectively through the solenoids S1–S12 which they control to line L2, and the energizing winding for solenoid 67 is connected across lines L1, L2.

Also, as shown in FIG. 1, the meter reading apparatus includes a transformer T, the secondary winding Ts of which is connected to energize line conductors L1 and L2, across which the motor M is connected, and the primary winding Tp of which is connected to a source of supply voltage, such as the 115 volt power line indicated in FIG. 1, through an energizing circuit controlled by a particular signal frequency sent out from the central station at the time it is desired to read the meters. This particular signal frequency is designed to match the tuned frequency of relay R1. When the contacts R1c of relay R1 close momentarily upon energization of the latter, they momentarily energize a conventional latching relay LR to close its contacts LRc which are connected in circuit with the transformer primary Tp thus causing the latter to be energized from the 115 volt power line. Contacts LRc remain closed during the time that the meter or meters are being read. They are re-opened at the end of the meter reading operation by a second pulse of the proper frequency sent out from the central station which for the second time momentarily energizes relay R1 causing its contacts R1c to momentarily close to thereby momentarily energize latching relay LR to open its contacts LRc and de-energize transformer T thus completing the reading at this particular meter location. As shown in FIG. 1, the pulse frequency sent out from the central station to energize relay R1 to start the meter reading may be carried over the same 115 volt power line that is used for energization of transformer T as indicated by the solid lines, or it can be carried over a telephone line shown in dotted lines in which event the frequency-responsive relay R1' would be associated with the telephone line, and it would operate in the same manner as relay R1. Normally the signal frequency would be carried over electric lines since most residences have electric service but all do not have telephone service. Also, very few homes have gas or water meters that do not also have electric service.

Operation

It is believed that the operation of the novel meter reading system will be clear from the detailed description which has been given. However, by way of brief review, when it is desired to read one or more meters at a particular location, a momentary frequency signal assigned to that location is sent out from the central station. This results in energization of relay R1 or relay R1' depending upon whether the power or telephone lines are used for the transmission. Relay contacts R1c momentarily close which results in momentary energization of latching relay LR and closure of relay contacts LRc which remain closed during the meter reading operation. This results in energization of transformer T and the application of voltage to conductors L1 and L2. Solenoid 67 connected across conductors L1, L2 is then energized withdrawing pin 68 from contact arm 55. As soon as this occurs, motor M which had also been energized since it is likewise connected across conductors L1, L2, then begins to rotate and initiate rotation of the pulse code control disc assembly comprising discs P0 to P9, Pa to Pd and contact arm 55. The relative rotational speeds of the code pulse disc assembly and contact arm 55 is so selected that the contact pin 56 on the latter moves clockwise as viewed in FIG. 1, for a distance equal to the length of one of the contact segments 53 on selector disc 52 for each revolution of the code pulse disc assembly. The first rotation of the code pulse disc assembly transmit the first digit of the four digit residence code number by way of pulses transmitted from oscillator 49 to the central station 50, such as by way of the 115 volt power line and the other lines electrically associated therewith in the power line distribution system, the number of pulses being determined by the number of contact pins 60 on disc Pa. The next three revolutions of the disc assembly transmit in a similar manner the second, third and fourth digits of the residence code number in terms of different numbers of pulses or spacing between pulses as established by the number of pins 60 and the spacings therebetween on discs Pb, Pc and Pd. By this time, contact arm 55 will have turned clockwise, as viewed in FIG. 1, in succession through the first four contact segments 53, having started at the top or the 12 o'clock position. When pin 56 on contact arm 55 reaches the fifth contact segment 53, it will be seen that the circuit for energizing solenoid S1 is completed between lines L1, L2. Solenoid S1 is associated with dial D1 of the four dial meter indicated in FIG. 2 and causes contact arm 13 of that dial to be pressed against one of contact segments 14. As previously explained, with contact arm 13 in the position depicted in FIG. 2 the particular contact segment 14 engaged is the one which lies between the numerical indications 9 and 0 on the dial. Since that particular segment is connected only to code pulse control disc P9, the complete revolution of the latter will result in the sending out of nine pulses from the oscillator to the central station. For the next three revolutions of the code pulse control disc assembly, in which contact arm 55 moves progressively clockwise, contact pin 56 will engage the sixth, seventh and eighth contact segments 53 with the result that solenoids S2, S3 and S4 will be energized in succession, each being energized for one revolution of the code pulse control assembly, and will respectively transmit the number of pulses corresponding to the respective positions of contact arms 13 on dials D2, D3 and D4. As previously explained, with the contact arms 13 in the respective positions indicated in FIG. 2, one pulse will be transmitted back to the central station for dial D2, five pulses will be transmitted back for dial D3, and two pulses will be transmitted for dial D4. This then completes the reading for the four-dial meter indicated in FIG. 2 which may, for example, be the electric watthour meter in the residence. Let it be assumed that the residence also includes a similar four-dial gas meter and a four-dial water meter. As contact arm 55 progressively engages the ninth to the twelfth contact segments 53, solenoids S5 to S8 associated with the gas meter will be energized in sequence to transmit the various dial readings of that meter by way of the code pulse control assembly of FIG. 2 to the central station. Similarly, as contact arm 55 progressively engages the thirteenth to the sixteenth contact segments 53, solenoids S9 to S12 associated with the water meter will be energized in sequence to transmit the various dial readings of that meter by way of the code pulse control assembly.

After the reading of the last meter has been transmitted to the central station in the form of coded pulses, contact arm 55 will have completed one revolution thus bringing it back to its starting position. At this moment, a second pulse is sent out from the central station to again momentarily energize the frequency responsive relay R1 or R1' which results in momentary energization of latching relay LR which causes the contacts LRc to re-open and de-energize transformer T. This results in de-energization of motor M and solenoid 67 whereupon the latch pin 68 controlled by the latter re-engages contact arm 55 to secure the latter in the upright, starting position shown in FIG. 1 and ready for the next reading operation on some subsequent date.

To start operation at the central station, an oscillator not shown, will be used to transmit programmed frequencies to reach the first residence where the meters are to be read. When the particular frequency that will energize the frequency-responsive relay at that residence is transmitted out over the carrier lines, it will simultaneously start a timing device, also not shown, at the central station. The timing device will be synchronized with the pulse transmitting equipment at the residence differing only to the extent that when the pulse transmitting rotating contact is on a contact segment, a rotating contact on the timing device will be on an insulated segment and vice versa. When the contact on the timing device reaches its first contact segment (the pulse transmission will be completed and the stepping relay at the central station, which steps up in accordance with the number of pulses received by it, will have the reading ready to be recorded). It will energize the recording device circuit from the stepping relay and will cause the reading to be recorded. After recording the reading of the last meter dial to be read at the residence, the timing device will cause transmission of the same tuned frequency pulse used to start the reading operation and hence, deenergize the circuits at the meter location as previously explained and also effect deenergization of the timing device. A frequency transmission program will then cause the next programmed frequency pulse to be sent out to pick up and read the meters at the next residence on the list.

In conclusion it is to be understood that while a preferred embodiment of the invention has been described and illustrated, various modifications of the construction and arrangement of parts may be made without, however, departing from the spirit and scope of the inventive concept as defined in the appended claims.

We claim:

1. Apparatus for telemetering to a remote location the relative positions of a plurality of rotary shafts of a meter register of the decimal integrating type, comprising a contact ring for and arranged concentric with each of said shafts, each such contact ring being constituted by ten contact segments insulated from each other, each said contact segment corresponding to a digital indicating position for the associated rotary shaft, a rotary contact arm for and cooperative with each of said contact rings, said contact arms being adapted for attachment to said meter register shafts and being normally maintained in spaced relation from said contact rings, a rotary code pulse assembly including a set of ten code pulse discs, means for rotating said code pulse disc assembly, each said disc having contacts thereon numerically representative respectively of each of the differently positioned contact segments of a contact ring, contact means associated respectively with said contacts on said code pulse discs for establishing intermittent contact therewith as said discs rotate, circuit means connecting like positioned contact segments on each of said contact rings to the contacts on the corresponding code pulse disc, and means for sequentially actuating each of said rotary contact arms into engagement with its associated contact ring, each said contact arm remaining engaged with its contact ring for one revolution of said code pulse disc assembly and then being released thereby to establish sequential pulsing circuits corresponding to the respective positions of said contact arms, each said pulsing circuit extending from said contact arm and the related contact segment and the contacts on the related code pulse disc to said contact means.

2. Apparatus as defined in claim 1 wherein said rotary code pulse disc assembly includes a second set of rotatable code pulse discs each of which includes contacts thereon representative in number of a different digit of the meter number, and means for establishing sequential code pulsing circuits through the contacts of said second set of discs for telemetering the meter number.

3. Apparatus as defined in claim 1 wherein said contact rings are supported by a plate member common thereto.

4. Apparatus as defined in claim 3 wherein corresponding positioned contact segments of the several contact rings on said plate are interconnected by respective conductors and said conductors are connected respectively to the contacts on the correlated code pulse discs.

5. Apparatus as defined in claim 1 wherein said set of code pulse discs are mounted on a rotary shaft in axially spaced relation.

6. Apparatus as defined in claim 1 wherein said means for sequentially actuating each of said rotary contact arms includes a solenoid individual thereto and having the armature member thereof coupled to a pivotally mounted member engageable with the contact arm, and a timer device for controlling sequential energization of said solenoids.

7. Apparatus as defined in claim 6 wherein said timer device includes a rotary contact arm driven by the means which rotates said code pulse disc assembly in cooperation with contact segments connected respectively to said solenoids.

8. Apparatus as defined in claim 1 wherein said contact segments on each said contact ring are insulated from each other by inserts of insulating material and which further includes deflector pins radially aligned with each of said insulating inserts, said deflector pins being cooperative with the ends of said contact arms to deflect the latter into engagement with a contact segment on either side of the insulating insert.

9. Apparatus for telemetering to a remote location the relative positions of a plurality of rotary shafts of a meter register of the decimal integrating type, comprising a contact ring for and arranged concentric with each of said shafts, each such contact ring being constituted by ten contact segments insulated from each other, each said contact segment corresponding to a different digital indicating position for the associated rotary shaft, a rotary contact arm for and cooperative with each of said contact rings, said contact arms being adapted for attachment to said meter register shafts and being normally maintained in spaced relation from said contact rings, means for actuating each of said rotary contact arms into engagement with its associated contact ring and then releasing the same prior to actuation of the next contact arm, a code pulse assembly having different pulse producing means characteristic respectively of the differently positioned contact segments of each contact ring, and circuit means for connecting said contact segments to their corresponding different pulse producing means and means activating said circuit means selectively dependent upon the rotary position of said contact arms upon movement into engagement with the corresponding positioned contact segment of the associated contact ring.

10. Apparatus for telemetering to a remote location the relative positions of a plurality of rotary shafts of a meter register of the decimal integrating type, comprising a contact ring for and arranged concentric with each of said shafts, each such contact ring being constituted by ten contact segments insulated from each other, each said contact segment corresponding to a different digital indicating position for the associated rotary shaft, rotary contact arms for and cooperative with each of said contact rings, said contact arms being adapted for attachment to said meter register shafts so as to establish contact with the contact segments on said rings, a code pulse assembly having different pulse producing means characteristic respectively of the differently positioned contact segments of each contact ring, groups of circuit means extending respectively from the contact segments of each contact ring to their corresponding different pulse producing means and which latter are activated selectively dependent upon the rotary position of said contact arms, and means rendering said circuit groups sequentially operative by establishing current flow through the corresponding contact arms, thereby to establish characteristic pulse outputs representative respectively of the positions of said contact arms on said contact rings.

References Cited in the file of this patent

UNITED STATES PATENTS

| | | |
|---|---|---|
| 504,335 | Egan | Sept. 5, 1893 |
| 2,082,697 | Ingerson | June 1, 1937 |
| 2,908,894 | Kienast | Oct. 13, 1959 |